Patented Aug. 8, 1944

2,355,225

UNITED STATES PATENT OFFICE 2,355,225

METHOD OF FORMING DEPOSITS BY SPRAYING

Wallace MacWilliam, Nutley, N. J., assignor to Resistoflex Corporation, Belleville, N. J., a corporation of New York No Drawing. Application September 30, 1942, Serial No. 460,234

5 Claims. (Cl. 117—104)

This invention relates to the production from solution of coatings, films or other deposits of plastic compositions. More particularly it relates to the spraying of solutions of water-soluble plastic materials and especially of polyvinyl alcohol compositions.

The term "polyvinyl alcohol" is used herein and in the claims to include that group of closely related materials generally referred to as polyvinyl alcohols, which are available commercially in different types and which may vary from one another in degree of polymerization, completeness of hydrolysis as measured by saponification number, viscosity in aqueous solution, solubility characteristics and the like.

Polyvinyl alcohol is a water-soluble plastic and aqueous solutions may readily be prepared from which tough elastic films, coatings and deposits may be formed by evaporation of solvent, such films, coatings or deposits having many important industrial applications by reason of the fact that polyvinyl alcohol is unaffected by all oils, greases, fats, hydrocarbons and most of the common organic solvents and has a high degree of impermeability to gases. The invention, however, may be practiced with solutions of other materials having similar characteristics.

In many manufacturing procedures it is highly desirable, economical and convenient to apply solutions of polyvinyl alcohol and other materials by spraying. The coating of fabrics, the formation of films by deposit on flat surfaces, or of shaped bodies by coating stripping forms, the encasing of an object in a protective film and the coating of fibrous or filamentary material with the solution as a binder are cited as typical examples of applications where spraying may be used to advantage.

It has heretofore been impossible to produce by spraying, using compressed air as the pressure medium in the usual way, films or homogeneous deposits of polyvinyl alcohol compositions. Attempts to do so have produced a frothy deposit or a layer of polyvinyl alcohol solution in which a multitude of air bubbles are occluded. Upon evaporation of solvent from such spray deposit, the resulting deposit or coating is of a spongy nature and is permeated with holes and air pockets. It has therefore been impossible, prior to the present invention, to use spraying as a method of forming continuous films, coatings or homogeneous deposits of polyvinyl alcohol.

The present invention resides in the discovery that uniform, homogeneous deposits, free from air bubbles, and forming smoothly flowing films can be produced by spraying polyvinyl alcohol compositions in the form of solutions if steam, preferably superheated steam, is used as the pressure medium for producing the spray.

Any suitable spray gun may be used, of which many are available, but it is preferred to use one of the pressure-fed type wherein the polyvinyl alcohol composition in the form of a solution is fed to the spray nozzle from a closed pressure vessel. This type is desirable because of the relatively high viscosity of such solutions. It also gives better control over the feed of polyvinyl alcohol solution than the vacuum-feed type of spray gun. The pressure supply line of the spray gun, which is customarily connected to a source of compressed air, is connected to any suitable source of steam.

It is preferred to use a spray gun which is equipped with separate valves for controlling the flow of the liquid and of the pressure atomizing medium, which valves are capable of being operated in sequence. Such a spray-gun as the "Thor" Model 7 manufactured by Binks Mfg. Co. of Chicago, Illinois, is suitable.

The reason for using this type of spray-gun is that it makes it possible to open the pressure valve controlling the steam to blow out of the line any water formed by condensation before the valve controlling the polyvinyl alcohol solution is opened. The solution can thus be fed into the spray only after steam substantially free from water is coming through the nozzle. If accumulated water produced by condensation is intermittently coming through with the solution, the deposit will not be uniform. Suitable precautions, on the part of the operator, should be taken to prevent this.

The optimum steam pressure, or the amount of superheating to which the steam is subjected, may vary with the equipment used and conditions prevailing, for example, the length of steam hose, the heat insulation provided, etc. The steam supply should provide a constant supply of steam under adequate pressure at the spray nozzle at all times. Steam obtained from an ordinary boiler may be utilized or it can be passed through an auxiliary superheater. By using substantially dry steam dilution of the solution to be sprayed is avoided. It has been found in practice that a steam source at a pressure of 125 pounds per square inch is adequate when using an uninsulated pressure hose of not over 5 feet in length for connection to the spray-gun. Higher pressures and temperatures may be used and may prove advantageous.

In addition to its surprising property of eliminating bubbles and foaming in the deposit produced by spraying, the use of steam has the further effect of increasing the evaporation of solvent from the solution and reducing the drying time of the deposit.

It may be found desirable to effect some modification in the spray-gun or to mount it on a suitable support with a view to protecting the operator from the heat of the gun which is attendant upon the use of steam as a pressure medium.

The solutions of polyvinyl alcohol or other materials used for spraying may be simple aqueous or water-miscible solutions or may be modified in known manner with plasticizers, coloring material, and other additions for giving the deposits any desired property. The solution may, if desired, be preheated before being fed to the spray-gun to reduce its viscosity. Excellent results have been obtained using polyvinyl alcohol solutions having a solid content of 24%.

The invention is, of course, not to be limited to the details herein described but is to be construed liberally within the purview of the claims.

What is claimed is:

1. The method of forming a homogeneous deposit free from occluded air bubbles from a water-miscible solution of polyvinyl alcohol of such viscosity that if sprayed by means of compressed air even at elevated temperatures it will form a frothy deposit, which comprises atomizing said solution by means of steam under pressure to form a spray, and depositing said spray on a surface.

2. The method of forming a homogeneous deposit free from occluded air bubbles from a water-miscible solution of polyvinyl alcohol of such viscosity that if sprayed by means of compressed air even at elevated temperatures it will form a frothy deposit which comprises atomizing said solution by means of superheated steam to form a spray, and depositing said spray on a surface.

3. The method of forming a homogeneous deposit free from occluded air bubbles from a water-miscible solution of polyvinyl alcohol of such viscosity that if sprayed by means of compressed air even at elevated temperatures it will form a frothy deposit, which comprises ejecting said solution from a spray-gun onto an object to be coated by means of superheated steam as a pressure medium.

4. The method of forming a homogeneous deposit free from occluded air bubbles from a water-miscible solution of polyvinyl alcohol of such viscosity that if sprayed by means of compressed air even at elevated temperatures it will form a frothy deposit, which comprises feeding said solution under pressure to a spray-gun and ejecting it therefrom onto a surface by means of steam under pressure.

5. The method of forming a homogeneous deposit free from occluded air bubbles from a water-miscible solution of polyvinyl alcohol of such viscosity that if sprayed by means of compressed air even at elevated temperatures it will form a frothy deposit, which comprises heating said solution, feeding it to a spray-gun under pressure, and ejecting it therefrom onto a surface by means of steam as the pressure medium.

WALLACE MACWILLIAM.